US012607516B2

(12) United States Patent　　　(10) Patent No.:　US 12,607,516 B2

Pau et al.　　　(45) Date of Patent:　Apr. 21, 2026

(54) WAVE FRONT SENSOR BASED ON FOURIER FILTERING

(71) Applicant: Arizona Board of Regents on Behalf of the University of Arizona, Tucson, AZ (US)

(72) Inventors: Stanley Pau, Tucson, AZ (US); David Brady, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 309 days.

(21) Appl. No.: 18/552,331

(22) PCT Filed: Mar. 25, 2022

(86) PCT No.: PCT/US2022/021952
§ 371 (c)(1),
(2) Date: Sep. 25, 2023

(87) PCT Pub. No.: WO2022/204518
PCT Pub. Date: Sep. 29, 2022

(65) Prior Publication Data
US 2024/0192060 A1　　Jun. 13, 2024

Related U.S. Application Data

(60) Provisional application No. 63/166,876, filed on Mar. 26, 2021.

(51) Int. Cl.
*G01J 9/00*　　　　(2006.01)
(52) U.S. Cl.
CPC ..................................... *G01J 9/00* (2013.01)

(58) Field of Classification Search
CPC ........................................................ G01J 9/00
(Continued)

(56) References Cited

U.S. PATENT DOCUMENTS 6,548,797 B1　4/2003　Ai
8,158,917 B2　4/2012　Li et al.
(Continued)

FOREIGN PATENT DOCUMENTS

CN　　　102967380　A　*　3/2013

OTHER PUBLICATIONS

Wavefront Sensor Applications, Axiom Optics, https://axiomoptics.com/application/wavefront-sensors-applications/.
(Continued)

*Primary Examiner* — Sunghee Y Gray
(74) *Attorney, Agent, or Firm* — Perkins Coie

(57)　　　　　ABSTRACT

Systems, devices and methods with improved wave front sensing and detection capabilities are described. One example wave front sensor includes a lenslet array that receives an incoming wave front, and a mask that is positioned at a focal plane of the lenslet array to receive and filter a Fourier transformed wave front that is produced by the first lenslet array at the focal plane. Each section of the mask receives light from a corresponding lens of the lenslet array and is configured to produce a reference wave front and to allow a portion of the Fourier transformed wave front to be transmitted or reflected. The wave front sensor also includes a sensor array having a plurality of light sensitive detectors that is positioned to receive the two wave fronts and to detect an intensity value representative of a phase of the incoming wave front.

19 Claims, 12 Drawing Sheets

(58) Field of Classification Search
USPC ......................................................... 356/364
See application file for complete search history.

(56) References Cited

U.S. PATENT DOCUMENTS

| 8,823,848 | B2 | 9/2014 | Chipman et al. | |
|---|---|---|---|---|
| 8,866,997 | B2 | 10/2014 | Pau et al. | |
| 9,182,289 | B2 | 11/2015 | Barrett et al. | |
| 9,976,912 | B2 | 5/2018 | Wallace | |
| 2007/0247638 | A1* | 10/2007 | Owner-Petersen .... | A61B 3/156 |
| | | | | 356/511 |
| 2012/0140242 | A1 | 6/2012 | Feng et al. | |
| 2015/0036148 | A1* | 2/2015 | Maeda ...................... | G01J 9/00 |
| | | | | 356/450 |
| 2017/0059446 | A1 | 3/2017 | Maeda | |
| 2019/0265107 | A1 | 8/2019 | Wang et al. | |

OTHER PUBLICATIONS

Goodman, J.W., Fourier Transforms Using Mathematica, Ch. 15.3, SPIE Press, 2020.

Hardy, J. W., A. J. MacGovern, "Shearing interferometry: a flexible technique for wavefront measurement," SPIE vol. 816, 180, 1987.

Millerd, J. E., N. J. Brock, J. C. Hayes, B. Kimbrough, M. Novak, M. North-Morris, J. C. Wyant, "Modern approaches in phase measuring metrology," Proc. SPIE vol. 5856, 14, 2005.

Millerd, J. E., N. J. Brock, J. C. Hayes, J. C. Wyant, "Instantaneous phase-shift point diffraction interferometer," Proc. SPIE 5531, 264, 2004.

Smartt, R. N. and W. H. Steel, "Theory and application of point-diffraction interferometers," Japan. J. Appl. Phys. 14 (1975) Suppl. 14-1.

Wang, D., C. Wang, X.Tian, H. Wu, J. Liang, R. Liang, "Snapshot phase-shifting lateral shearing interferometer," Optics and Lasers in Engineering, 128 (2020) 106032.

International Search Report and Written Opinion mailed Jun. 28, 2022 for International Patent Application No. PCT/US22/21952 (11 pages).

Murphy, Douglas B., et al., "Introduction to Phase Contrast Microscopy," Nikon, Accessed Sep. 18, 2023 via: https://www.microscopyu.com/techniques/phase-contrast/introduction-to-phase-contrast-microscopy.

* cited by examiner

200

620

610

600

702

701

704

703

700

WAVE FRONT SENSOR BASED ON FOURIER FILTERING

CROSS-REFERENCE TO RELATED APPLICATION(S)

This patent document is a 371 National Stage Application of International Patent Application No. PCT/US2022/021952, filed Mar. 25, 2022, which claims priority to the provisional application with Ser. No. 63/166,876, titled "WAVE FRONT SENSOR BASED ON FOURIER FILTERING," filed Mar. 26, 2021. The entire contents of the above noted applications are incorporated by reference as part of the disclosure of this document.

TECHNICAL FIELD

The technology in this document generally relates to wave front sensing and measurement of electromagnetic waves.

BACKGROUND

A wave front sensor measures both the phase and the intensity of an electromagnetic wave front. The wave front of the electromagnetic wave is a surface where the phase of the wave is constant, having the same optical path length from the source. Example wave fronts include plane wave fronts and spherical wave fronts, where the surfaces are a plane and a sphere, respectively. Aberration is often defined as a deviation from a reference surface such as a plane or a sphere. Generally, the wave front in most situations is a complex surface of both space and time. Measurement of a wave front allows a better understanding of the wave front characteristics that can be used to, for example, correct or compensate the extant aberrations and to improve the quality of images captured in an optical system.

SUMMARY

The disclosed embodiments relate to devices, systems and methods that, among other features and benefits, use optical systems with Fourier transform capabilities to improve wave front sensing and detection. One example wave front sensor system includes a first lenslet array that includes a plurality of lenses positioned to receive at least a portion of an incoming wave front. The wave front sensor system also includes a mask positioned at a focal plane of the first lenslet array to receive and filter a Fourier transformed wave front that is produced by the first lenslet array at the focal plane. The mask includes a plurality of sections; each section of the mask is configured to receive light from a corresponding lens of the first lenslet array. Each section of the mask is also configured to (a) produce a reference wave front from the Fourier transformed wave front incident thereon and (b) allow a portion of the Fourier transformed wave front incident thereon to pass therethrough or reflect therefrom. The wave front sensor system additionally includes a sensor array that includes a plurality of light sensitive detectors and is positioned to receive the reference wave front produced in (a) and the wavefront in (b), and to detect an intensity value representative of a phase of the incoming wave front.

DETAILED DESCRIPTION

Wave front sensing and measurement can be used to enhance the understanding of an imaging system and to correct or compensate for detected wave front errors. Applications of wave front sensor include semiconductor and precision optics metrology, ophthalmic diagnostic imaging, remote sensing and laser beam characterization. In addition, a wave front sensor is a key component of adaptive optics system which is used in astronomy, vision science, microscopy, laser and microelectronics manufacturing and free space optical communications.

Figure 1:
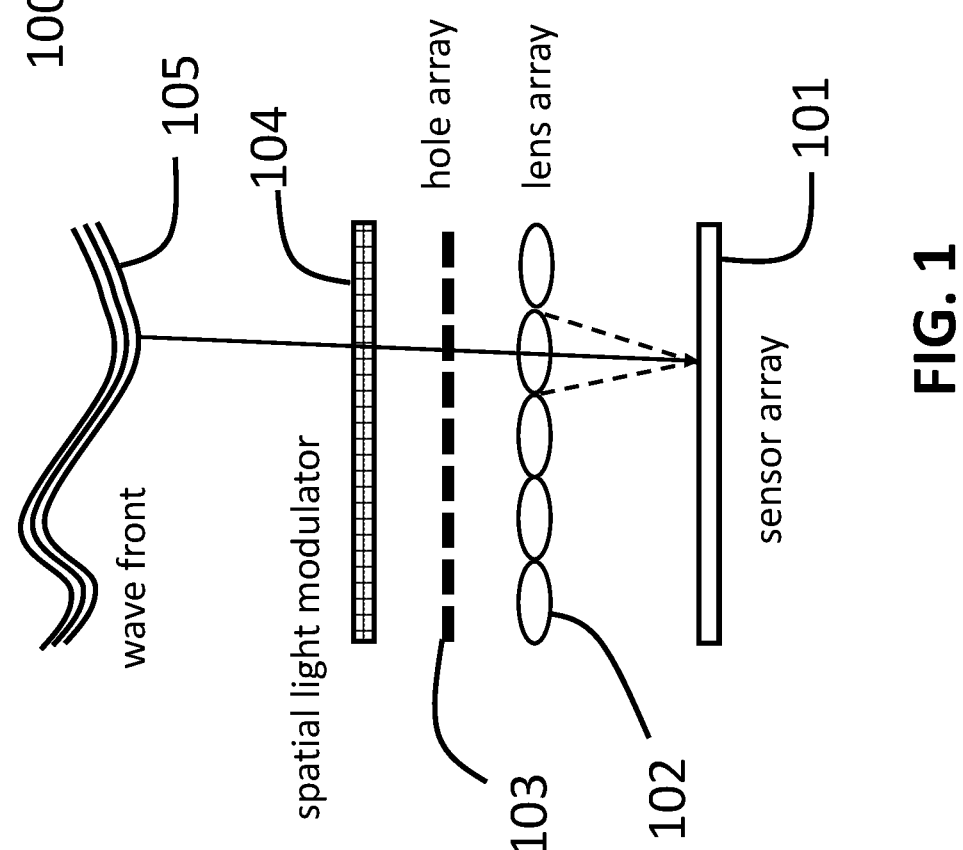
FIG. 1 illustrates an example configuration of a Shack-Hartmann wavefront sensor.

A wave front sensor measures both the phase and the intensity of a wave front. One type of a common wave front sensor is the Shack-Hartmann wavefront sensor (SHWS). FIG. 1 shows one version of an SHWS 100 with incoming wave front 105, which includes a sensor array 101, such as a CMOS, a CCD, a PMT, an SPAD array sensor, one or a combination of: a lenslet array 102, a hole or aperture array 103, and a spatial light modulator 104. The sensor is located at the focal plane of the lenslet. For each lenslet, the displacement of the intensity centroid relative to a predefined reference spot provides the propagation angle of the wave front. The wave front is approximated by a discrete array of propagation angles, with the lateral resolution of the SHWS given by the size of the lenslet array. In such a way, the wave front is constructed based on the measured intensity of the sensor array. Existing SHWSs have nanometer resolution, dynamic range of thousands of waves, and linearity of over 99.9%. One disadvantage of the SHWS is the susceptibility of the sensor to noise for low order aberrations such as tip, tilt and focus. Thus, there is a need to develop new and better wave front sensors especially for low light applications.

Figure 2:
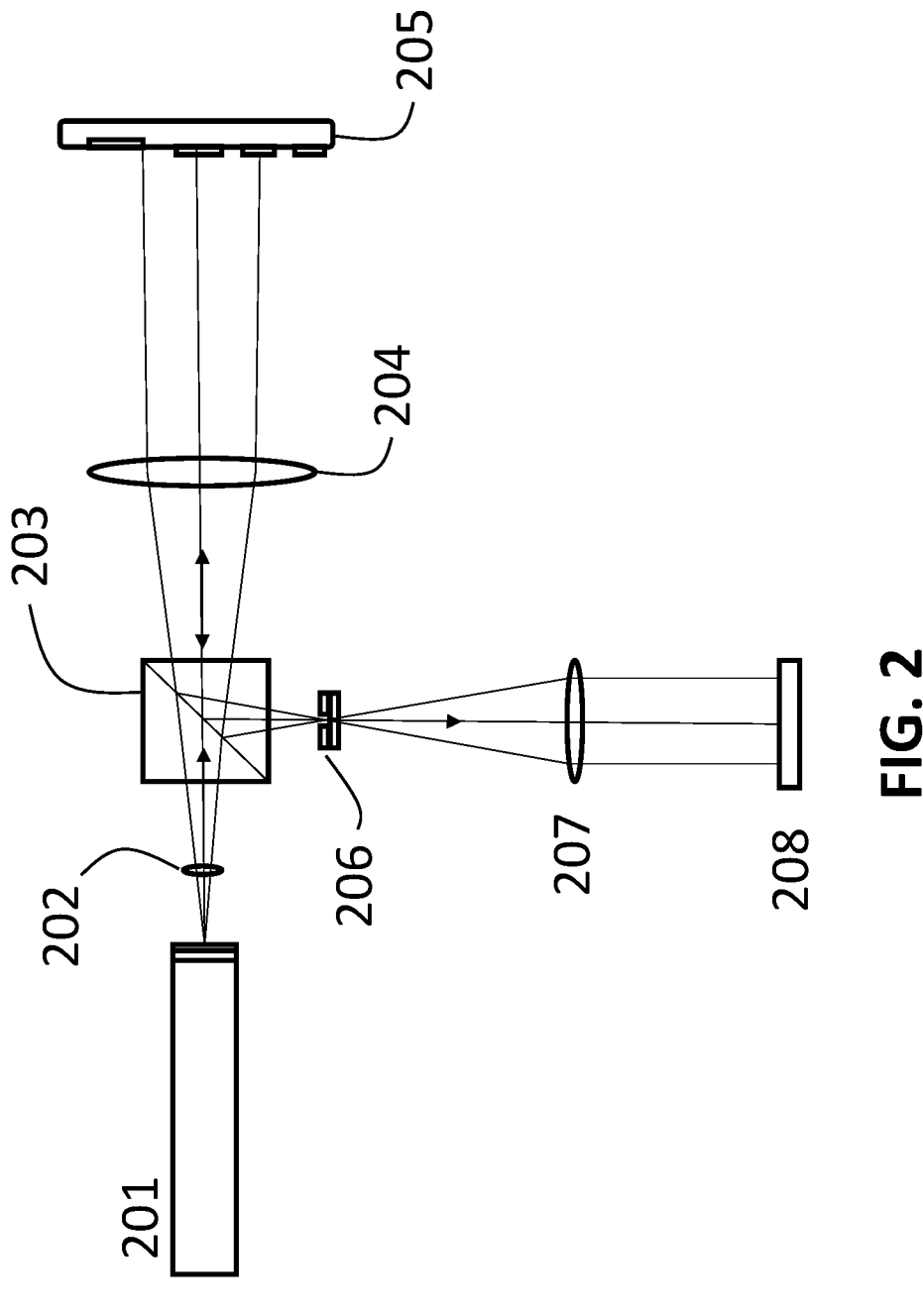
FIG. 2 illustrates an example configuration of a point diffraction interferometer that can be used to measure phase variations of a wave front.

Point diffraction interferometer (PDI) is a common-path interferometer that measures the phase variation of a wave front. The PDI utilizes a reference wave generated by light diffracted from an absorbing pinhole filter in the optical path to interfere with the transmitted and undiffracted light of the wave front to be measured. FIG. 2 shows one configuration of a PDI with a laser 201 as an illuminator. Light from the laser 201 passes through a lens 202 onto a beamsplitter 203 through a lens 204 to a device under test (DUT) 205. The light is reflected from DUT 205 back to a lens 204 and a beamsplitter 203 and on to a pinhole filter 206, which serves as a diffracting aperture. The pinhole filter 206 is, for example, made of an absorbing metal coating, typically between 0.005 to 0.05 transmissions, on a clear substrate, and it is also commonly referred to as a point diffraction plate (PDP). The light that is collected by lens 207 includes both the reference wave generated by the PDP and the light reflected from DUT 205 that interfere with each other and form an interference pattern that is detected by the detector array 208. Interference pattern is obtained when the location of the pinhole filter 206 is close to the position of the focal plane of the lens 204. In some configurations, the PDP 206 is a patterned wire grid polarizer, and the sensor or detector array 208 is a polarization sensitive camera.

Figure 3:
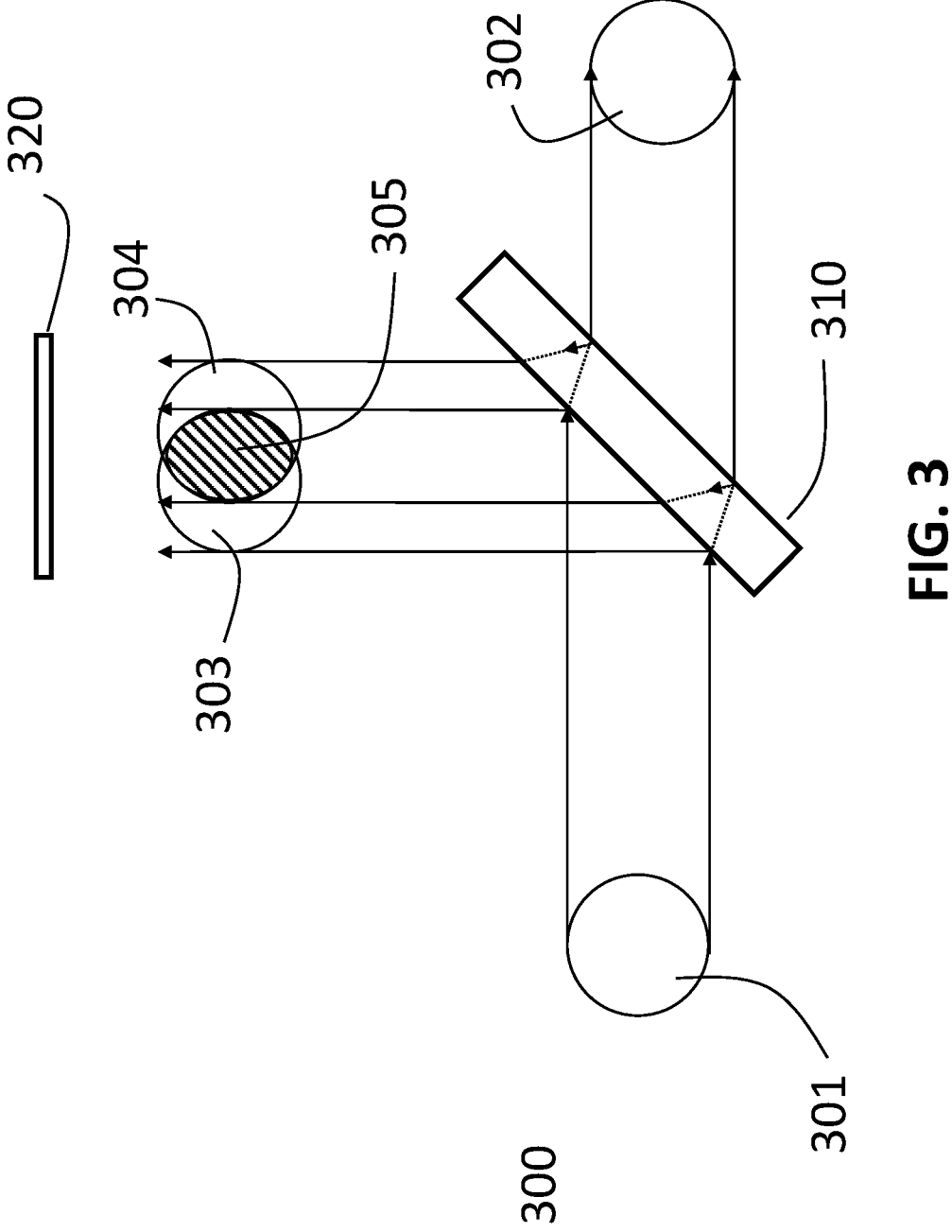
FIG. 3 illustrates an example configuration of a shearing interferometer that can be used for measuring wave fronts.

Shearing interferometry is a self-referencing technique that measures the phase in optical wave fronts. An interference pattern is formed between the wave front and a displaced part of itself. The displacement can be lateral, radial or rotational. Generally, at least two sets of interferograms are measured in orthogonal directions, and the data is processed to calculate the wave front. The technique can operate with a broadband light source and moderate spatial coherence. FIG. 3 shows a shearing interferometer 300 using a plane parallel shear plate 310. The input beam 301 has a circular cross-section. It propagates from left to right and is reflected off the front surface of the shear plate 310 to form a first reflected beam 303. Part of the beam 301 that enter the shear plate 310 is reflected off the back surface of the shear plate 310 and forms a second reflected beam 304, which is a displaced version of 303. The remaining beam is transmitted to form the beam 302. The beams 303 and 304 which form an overlapping region denoted by 305 interfere with each other. The interferogram can be measured by a detector array 320. In some configurations, the shear plate 310 is a polarization beam splitter, and the detector 320 is a polarization sensitive detector array.

Figure 4:
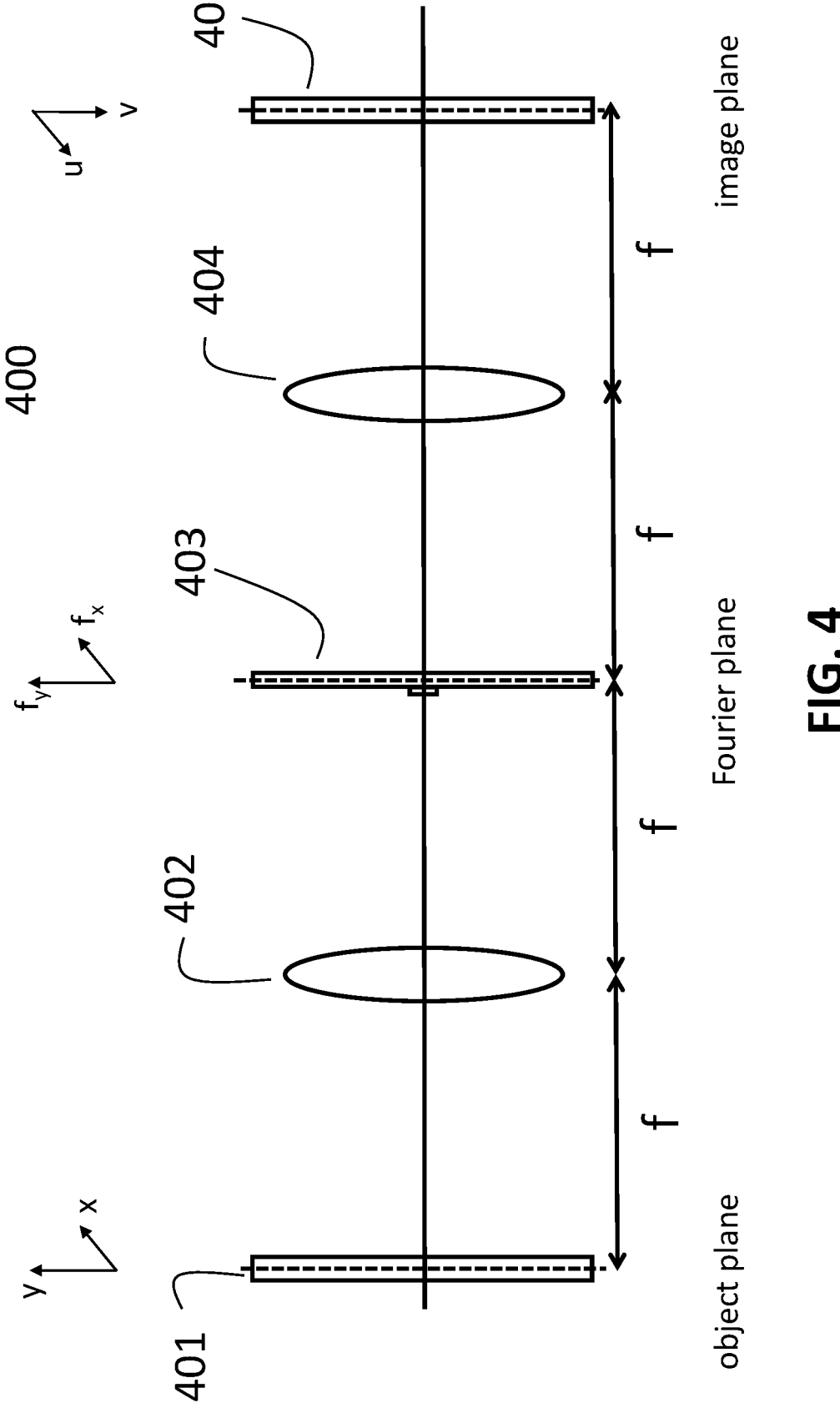
FIG. 4 illustrates an example 4-f optical system that includes an amplitude and phase mask.

Phase contrast imaging and microscopy is a technique first developed by Frits Zernike to convert small variation of phase in the wave front to corresponding changes in amplitude which can be detected by conventional imaging devices and the human eyes. The operating principles of the phase contrast technique can be described by Fourier analysis. The following provides a simple explanation in connection with FIG. 4, which shows a 4-f optical system 400, including two lenses 402 and 404 of identical focal length f. Light propagates from left to right, first through a phase plate 401, lens 402, an amplitude and phase mask 403, lens 404 to detector array 405. The phase plate 401 generates a nonuniform wave front at the object plane one focal distance to the left of lens 402. The lens 402 performs an optical Fourier transform of the wave front at one focal distance to the right of the lens incident on the mask 403 at the Fourier plane. The mask 403 filters the wave front, and the wave front propagates through the lens 404 which performs another Fourier transform of the filtered wave front at one focal distance to the right of lens 404 at the image plane. The wave front at the object plane can be described by the function $P(x, y) = e^{i\phi(x,y)}$, where $\phi(x, y)$ is the phase. For small phase values, the wave front at the object plane can be described by:

$$P(x,y)=e^{i\phi(x,y)}\approx1+i\phi(x,y) \qquad (1).$$

At the Fourier plane, the wave front is represented by:

$$F\{P(x,y)\}=\delta(f_x,f_y)+F\{i\phi(x,y)\} \qquad (2).$$

In Equation (2), $F\{\bullet\}$ is the Fourier transform and $\delta(f_x, f_y)$ is the delta function, i.e., a peak at the origin. The mask 403 introduces a phase shift of $\pi/2$ the delta function and leaves the remaining phase unchanged. This can be accomplished for example by etching a small disk at the center of a glass substrate (shown at the center of mask 403 in FIG. 4). The diameter of the disk can be set to equal to roughly half the Airy diameter, $1.22\lambda/NA$, where $\lambda$ and NA are the wavelength and numerical aperture of the lens, respectively. Behind the mask, the wave front is represented by:

$$e^{i\pi/2}\delta(f_x,f_y)+iF\{\phi(x,y)\} \qquad (3).$$

The intensity in the image plane is the Fourier transform of this and is approximately:

$$I(u,v)\propto|i(1+\phi)|^2\approx1+2\phi \qquad (4).$$

In phase contrast imaging and microscopy, the net effect of the mask in the 4-f system is to convert any phase variation to intensity variation, which can be detected and seen by the naked eye. In the above example, without the mask, the intensity in the image plane is constant, i.e., no contrast. The concept of phase contrast imaging is similar to that of the PDI in that the incident wave, attenuated by an absorbing film at the focal plane interferes with a spherical wave diffracted by a pinhole discontinuity in the film.

The concept of Fourier transformation can also be applied to the configuration in FIG. 1, where the lenslet in an SHWS can be viewed as performing a Fourier transform of an incoming quasi plane wave, which is part of a more complex wave front. The detector in the SHWS measures the displaced delta function, which gives the spatial frequencies of the quasi plane wave, i.e. the tilt of the wave front. The complex wave front is divided into multiple quasi plane waves which are sampled by the lenslet array.

Figure 5:
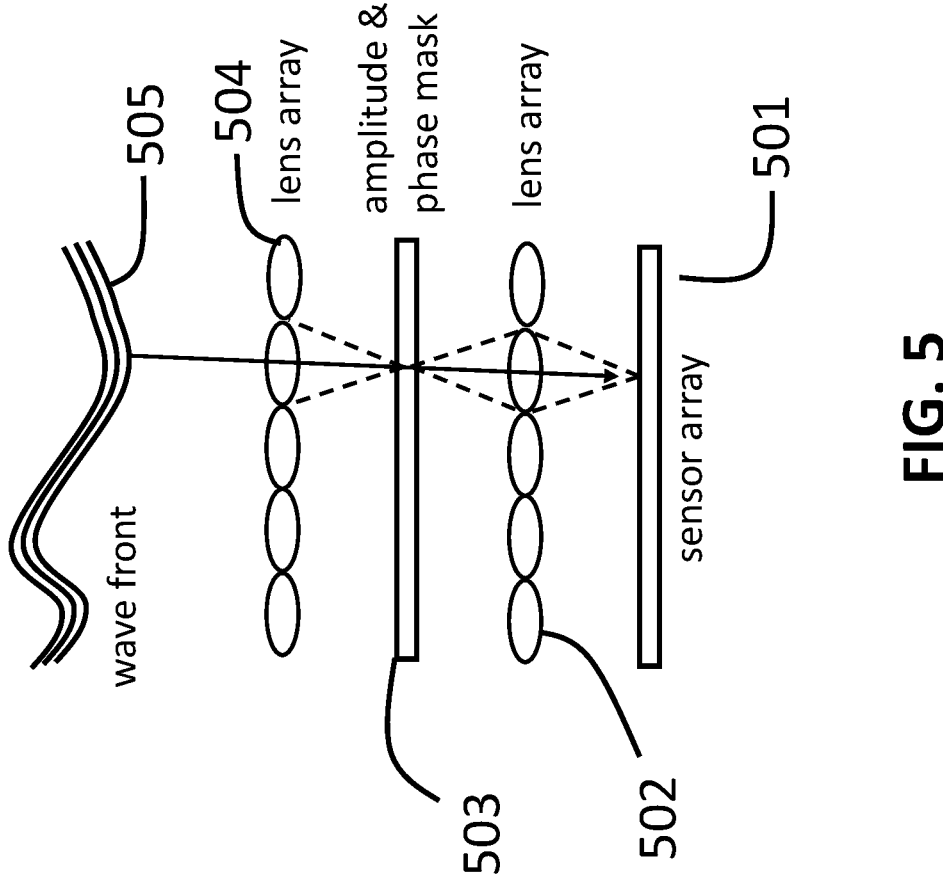
FIG. 5 illustrates a wave front sensor that includes an array of 4-f systems in accordance with an example embodiment.

The disclosed embodiments, among other features and benefits, use optical systems with Fourier transform capabilities to improve wave front sensing and detection. FIG. 5 illustrates an example wave front sensor in accordance with an example embodiment. The wave front sensor 500 includes an array of 4-f systems that includes an arrayed (or pixelated) amplitude and phase mask 503, and an imaging sensor 501. Each 4-f system includes lenslet 502, amplitude and phase mask 503, and lenslet 504. The array operates as a wave front sensor by measuring intensity profiles which are related to the phase at different parts of the incoming wave front 505. The mask 503 converts phase variations into intensity variations. The sensor 500 can be calibrated using a set of standards to improve the precision and accuracy of the measurement process. In some embodiments, the mask 503 can be a programmable mask such as a spatial light modulator. The spatial pattern, as well as the transmission and phase distribution of the mask, is tunable by external voltages. In other embodiments, the lenslet 502 and 504 can be Fresnel zone plates, form birefringent optical filters, metamaterial and/or liquid crystal polymer lenses. In some embodiments, the mask 503 can be comprise form birefringent optical filters, metamaterials, liquid crystal polymer optical and/or patterned phase gratings.

In some embodiments of the wave front sensor 500, a pinhole array and/or a spatial light modulator, such as those shown in FIG. 1 in a SHWS configuration, can be used in place of or in addition to the first lenslet array 504. While a 4-f system is the standard configuration to perform optical Fourier transform and filtering of a wave front, there are other configurations to perform Fourier filtering using multiple lenses and filters, and the embodiments of the present disclosure should not be limited to an array of the standard 4-f system.

In some embodiments, the detector array in the imaging sensor 501 has many pixels. For example, the detector array can have 10 by $10^4$ pixels, with a total of $10^8$ pixels in a square grid. Each lenslet in the arrays 502 and 504 covers 200 by 200 pixels of the detector array, such that there are 50 by 50 lenses or 2500 lens in each lens array. In general, the number of pixels under each lens can range from one, to hundreds, or to thousands depending on the application. In addition, each pixel in the detector array may have a micro-lens to collect the incoming light. Each pixel in the detector array may also have color and polarization filters that transmit and block out light of different wavelengths and polarization states.

Figure 6:
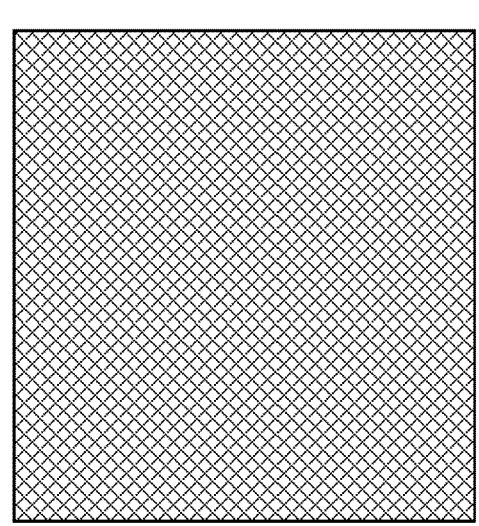
FIG. 6 illustrates example tiling configurations of lenses in lenslet arrays that can be used in wavefront sensors in accordance with some embodiments.
Figure 6:
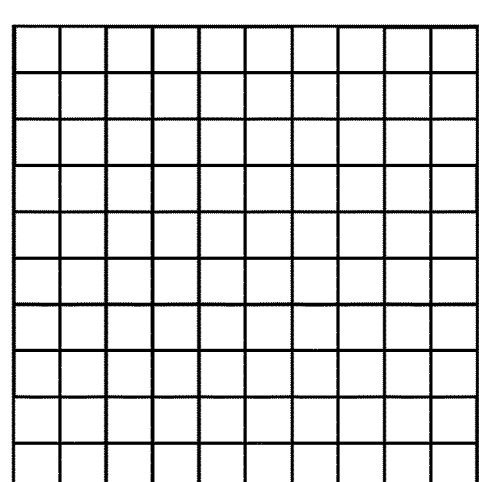
Figure 6:
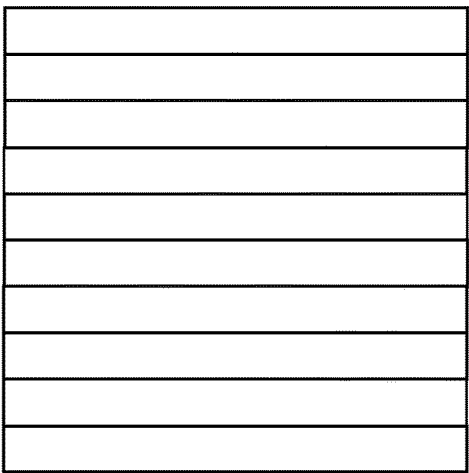

Different tiling and configurations of the 4-f system can be made depending on the application; FIG. 6 shows some example tiling configurations of the lenses in the lenslet arrays. In one example, an array of cylindrical lenses 600 can be repeated in one direction. In another example, the lenses can be arranged in a square grid configuration 610 or, in another example, in a rotated square grid configuration 620. The arrangement can be periodic or nonperiodic. The unit cell of the repeating lens array can be hexagonal, octagonal, a combination thereof or others. Different configurations can be utilized to match and sample the shape of the wave front, if prior knowledge of the wave front shape is known. For example, a higher density array of lenses can be used to sample regions of wave front that is rapidly changing, whereas a lower density lens array can be used to sample regions of wave front that is slowly changing.

Figure 7:
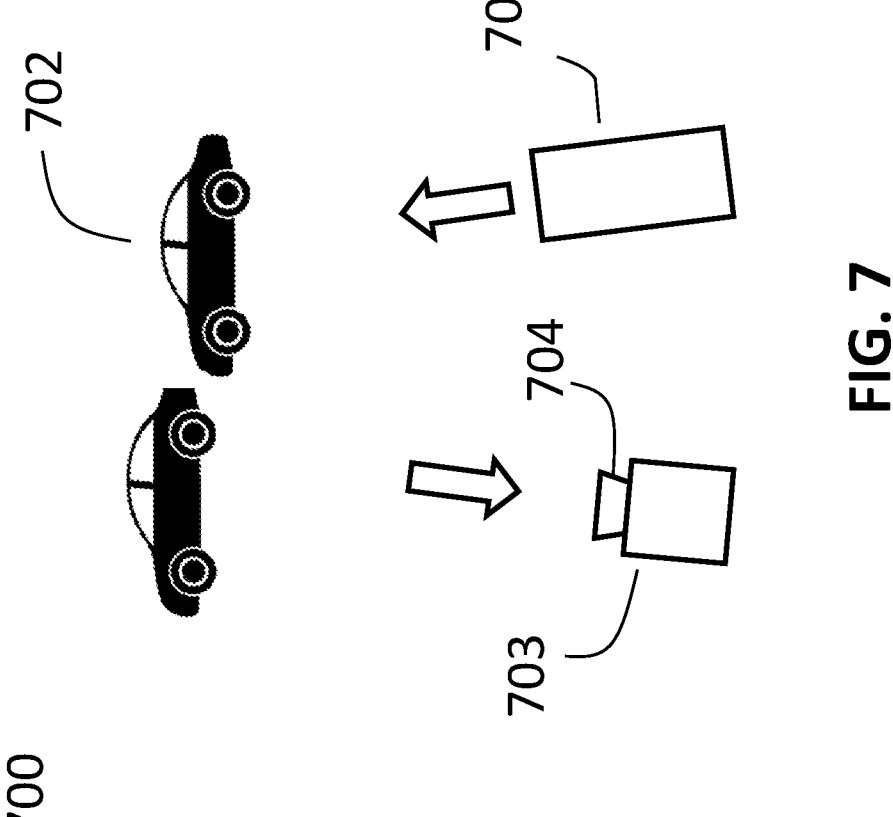
FIG. 7 illustrates a configuration in which a wave front sensor is used in conjunction with an active illumination source in accordance with an example embodiment.
Figure 8:
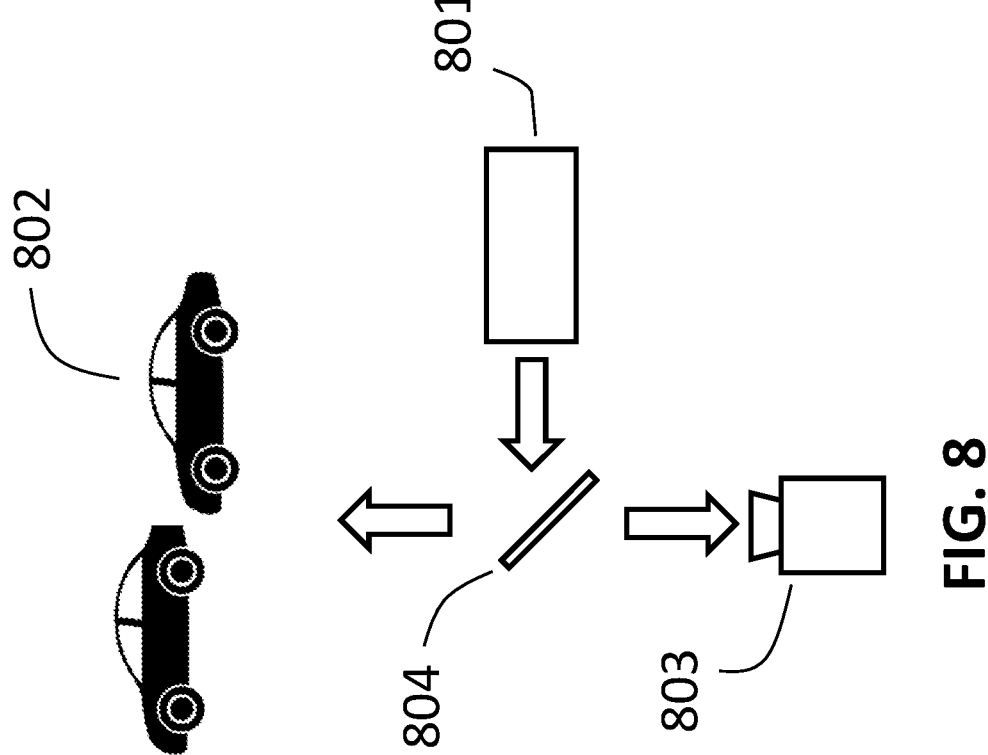
FIG. 8 illustrates a configuration in which a wave front sensor is used in conjunction with an active illumination source in accordance with another example embodiment.

In some applications, active illumination using a coherent source such as a laser may be used in combination with the wave front sensor. FIG. 7 shows an example configuration 700 in which light from an illumination source 701 is directed to the object of interest 702 (e.g., one or more vehicles). The source 701 can be a scanning source that rotates in one or two orthogonal axes. Reflected light is measured using a wave front sensor 703. The wave front sensor 703 has a lens assembly 704, which is positioned in front of the lens array 504. In another example configuration 800, FIG. 8 shows light from an illumination source 801 is reflected from a beamsplitter 804 to the object of interest 802. Reflected light transmitted through the beamsplitter 804 is received by a wave front sensor 803. Compared to FIG. 7, the configuration of FIG. 8 can be constructed in a more compact form, where the illumination source and the wave front sensor are positioned within a single device or in close proximity to each other.

Figure 9:
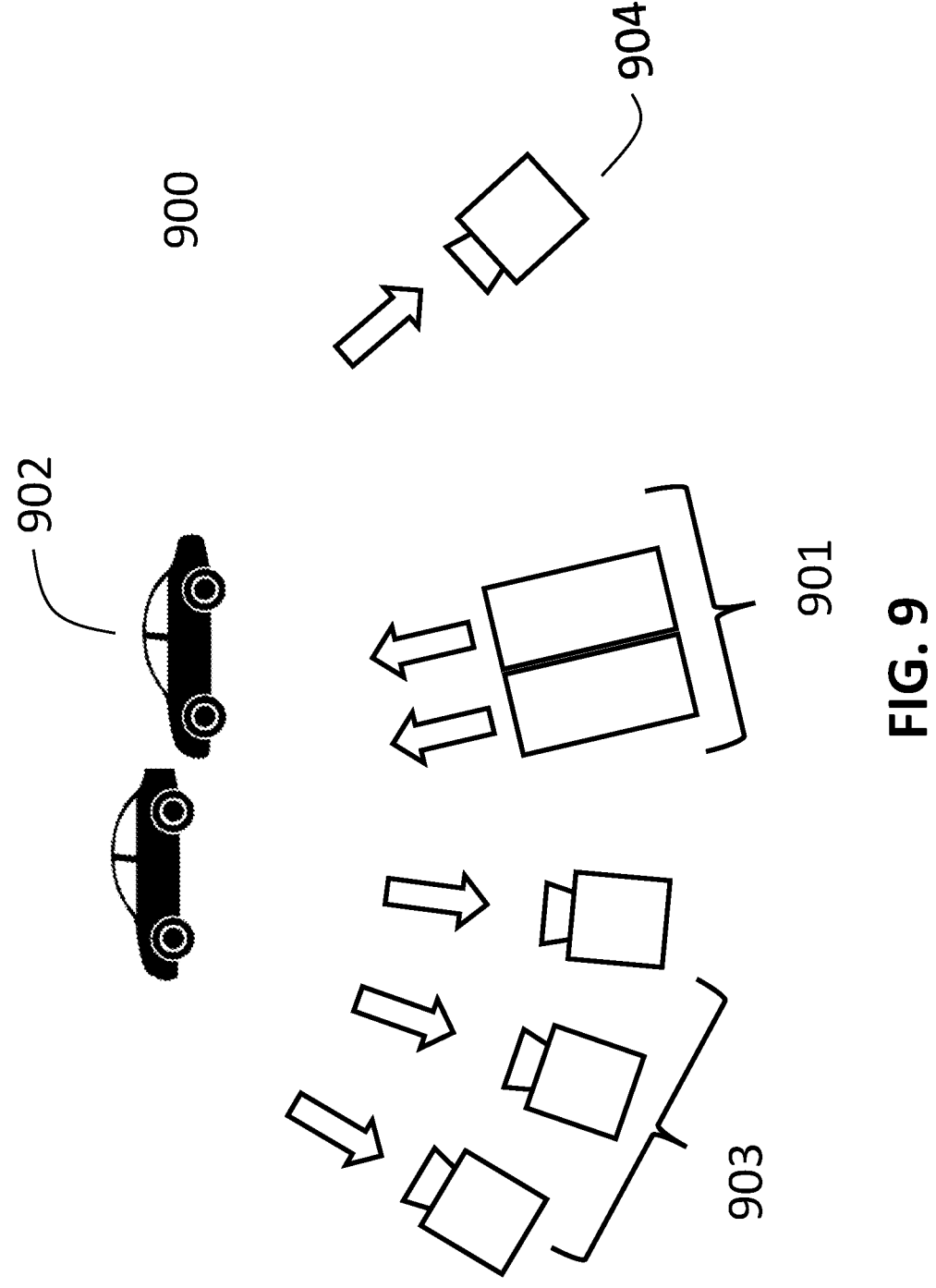
FIG. 9 illustrates a configuration in which a plurality of wave front sensors is used in conjunction with one or more arrays of illumination sources in accordance with an example embodiment.

FIG. 9 shows another example configuration 900, in which light from one or more arrays of illumination sources 901 is directed to the object of interest 902. Reflected light is measured using one or more or arrays of wave front sensors 903 and 904. The resolution of the measurement is determined by the distance between the sensors and the illumination sources. The measurement is similar to a synthetic aperture imaging system and ptychographic imaging where the wave fronts of an object of interest are measured at different locations and illuminated by sources at different positions. Each wave front measurement provides information to a part of the Fourier space of the scattered field, and combining all the measurements enables the reconstruction of the object with higher resolution than that from a single measurement. The configuration of FIG. 9 can also be advantageously used to provide illumination at multiple wavelengths and/or multiple polarizations. In some embodiments, each wave front sensor 903, 904 can be configured to have a different dynamic range.

Figure 10:
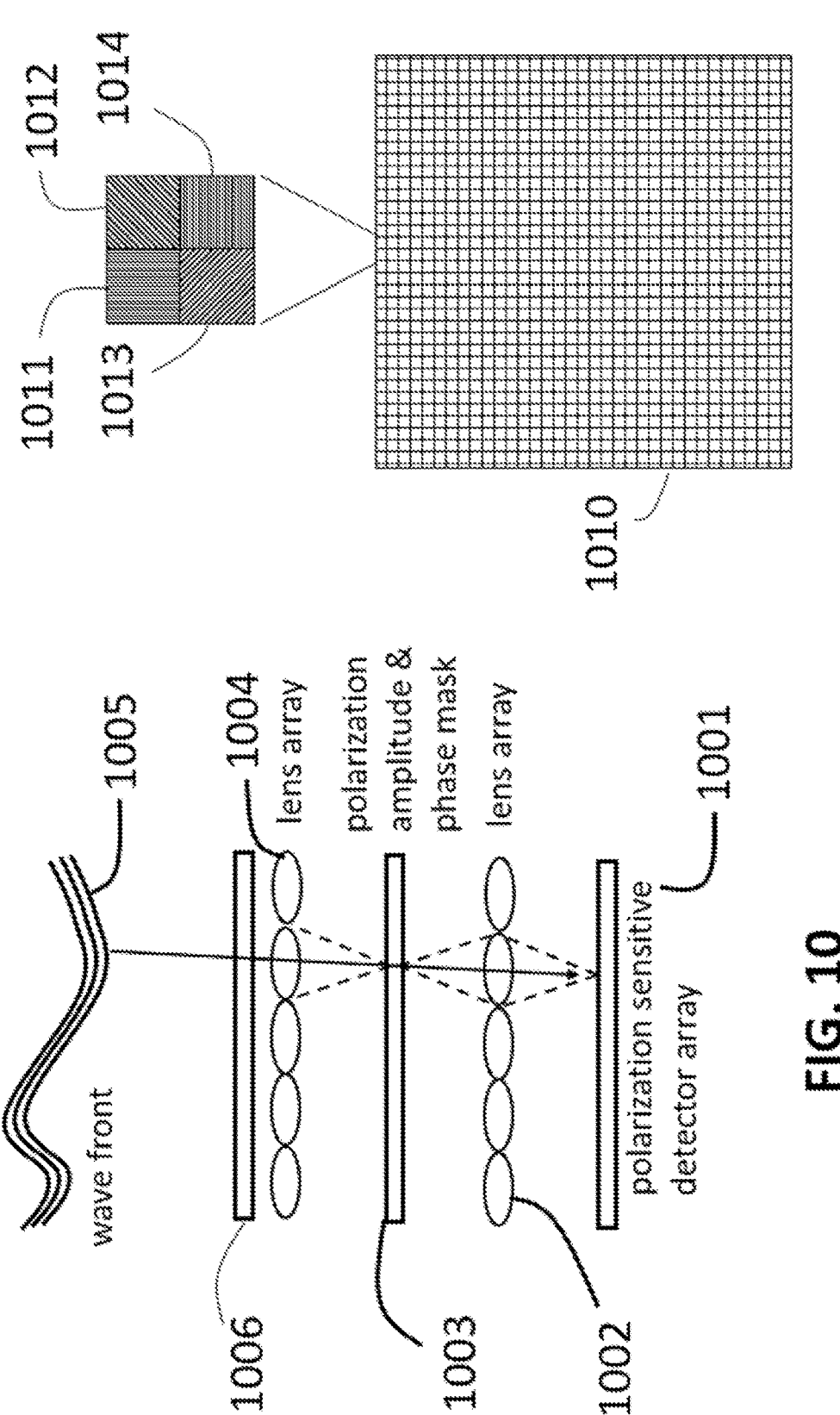
FIG. 10 illustrates a wave front sensor configuration that incorporates Fourier filtering and snapshot phase-shifting interferometry in accordance with an example embodiment.

In the configuration shown in FIG. 5, the measured intensity values on the sensor array 501 correspond to one interferogram that is produced due to the interference of the reference wave front and the wave front associated with a part of the input wave front. The instrument can be adapted to measure intensity values corresponding to multiple interferograms at the same time by using phase-shifting interferometric techniques. In conventional phase-shifting interferometry, three or more interferograms are measured where the phase difference between the two interfering beams is changed by a fixed amount. FIG. 10 shows one configuration of a wave front sensor that combines the Fourier filtering of the configuration based on the wave front sensor 500 in FIG. 5 and snapshot phase-shifting interferometry. The polarization sensitive detector array 1001 can be a division-of-focal-plane polarization sensitive focal plane array with four different sets of linear polarizers oriented at 0, 45, −45 and 90 degrees. A top view of the detector array 1001, showing an array of square pixels in a square grid 1010, is depicted on the right side of the figure. Each pixel has a linear polarizer on top thereof, for example linear polarizers 1011, 1012, 1013 and 1014. Incoming wave front first passes through a waveplate and/or polarizer 1006 to lens array 1004. A polarization sensitive mask 1003 is placed in the Fourier plane. The mask 1003 can be made of an array of disks of wire grid polarizer oriented in one direction, i.e., transparent to one linear polarization state, with the remaining mask made of wire grid polarizers oriented in the orthogonal direction, i.e., transparent to the orthogonal linear polarization state. The mask 1003 creates a transmitted wave in one polarization and a diffracted reference wave in an orthogonal polarization. The transmitted and reference waves pass through lens 1002 onto a polarization sensitive sensor array 1001. Four sets of pixels with a different linear polarizer in the sensor 1001 measure four phase-shifted interferograms at the same time. Key advantages of this technique are the high accuracy of the measurement and the insensitivity to vibration in the environment.

Figure 11:
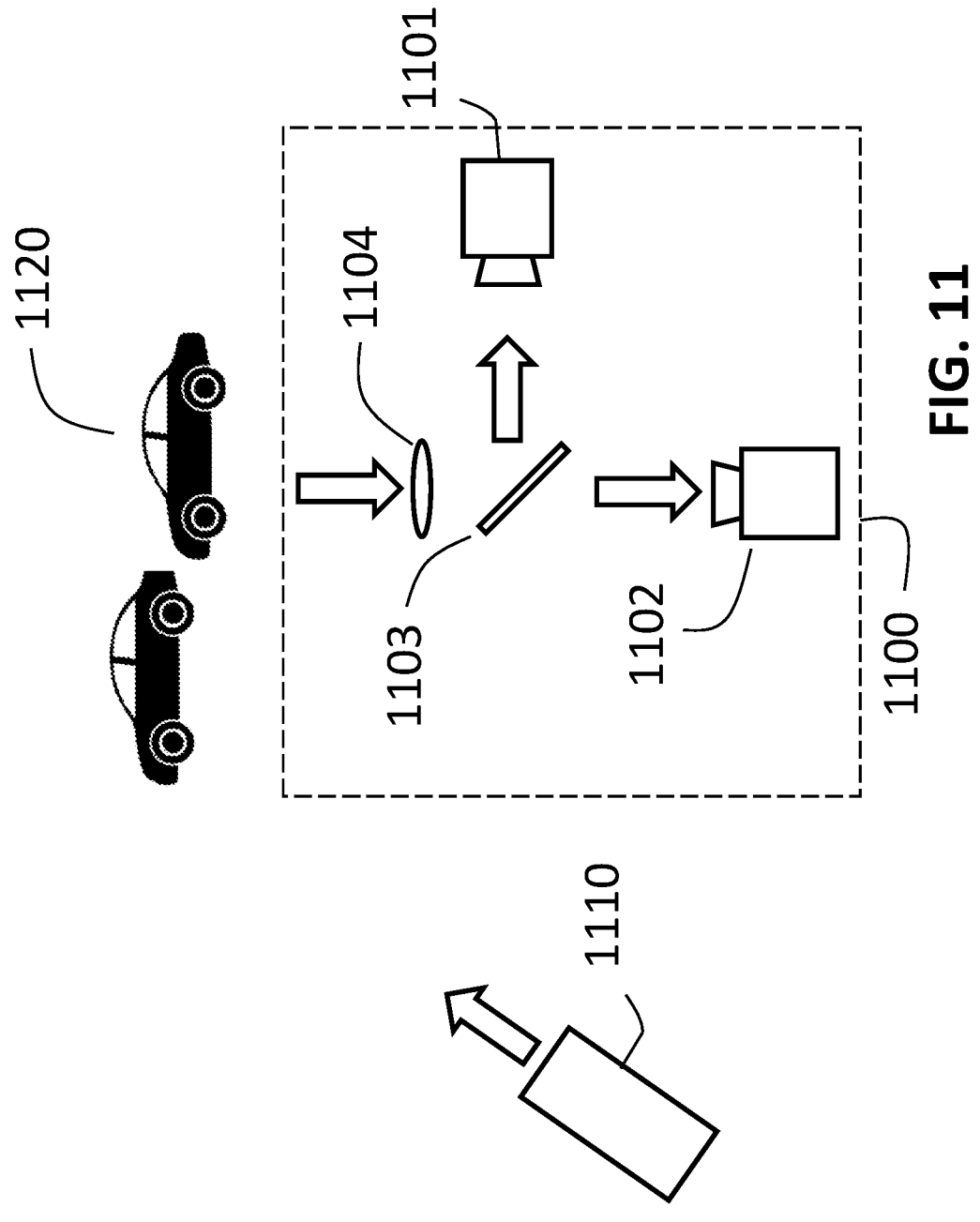
FIG. 11 illustrates a dual wave front sensor configuration in accordance with an example embodiment.

FIG. 11 shows yet another configuration for a dual wave front sensor 1100. Light from an illumination source 1110 is directed to the object of interest 1120. Reflected light is collected by lens assembly 1104 and is transmitted through the beamsplitter 1103 to a wave front sensor 1102. Some of the light is reflected by the beamsplitter 1103 to another wave front sensor 1101. For example, each of the wave front sensors 1101 and 1102 can include a wave front sensor such the ones shown in FIG. 5 or in FIG. 10.

The disclosed embodiments describe wave front sensors based on Fourier filtering using an amplitude, polarization and/or phase mask as illustrated using the example configuration disclosed herein. The incoming wave front is divided into smaller wave fronts which are incident on and measured by individual lenslet and Fourier filtering unit. Each unit produces a reference wave front that interferes with part of the input wavefront that is sensed at a sensor array. The detector array for the entire wave front sensor can be sensitive to wavelength, polarization and intensity of incoming light. The components of the system can be reflective or refractive components (e.g., mirrors and/or lenses) and thus the disclosed embodiments can be implemented in refractive or reflective modes or combinations thereof.

Figure 12:
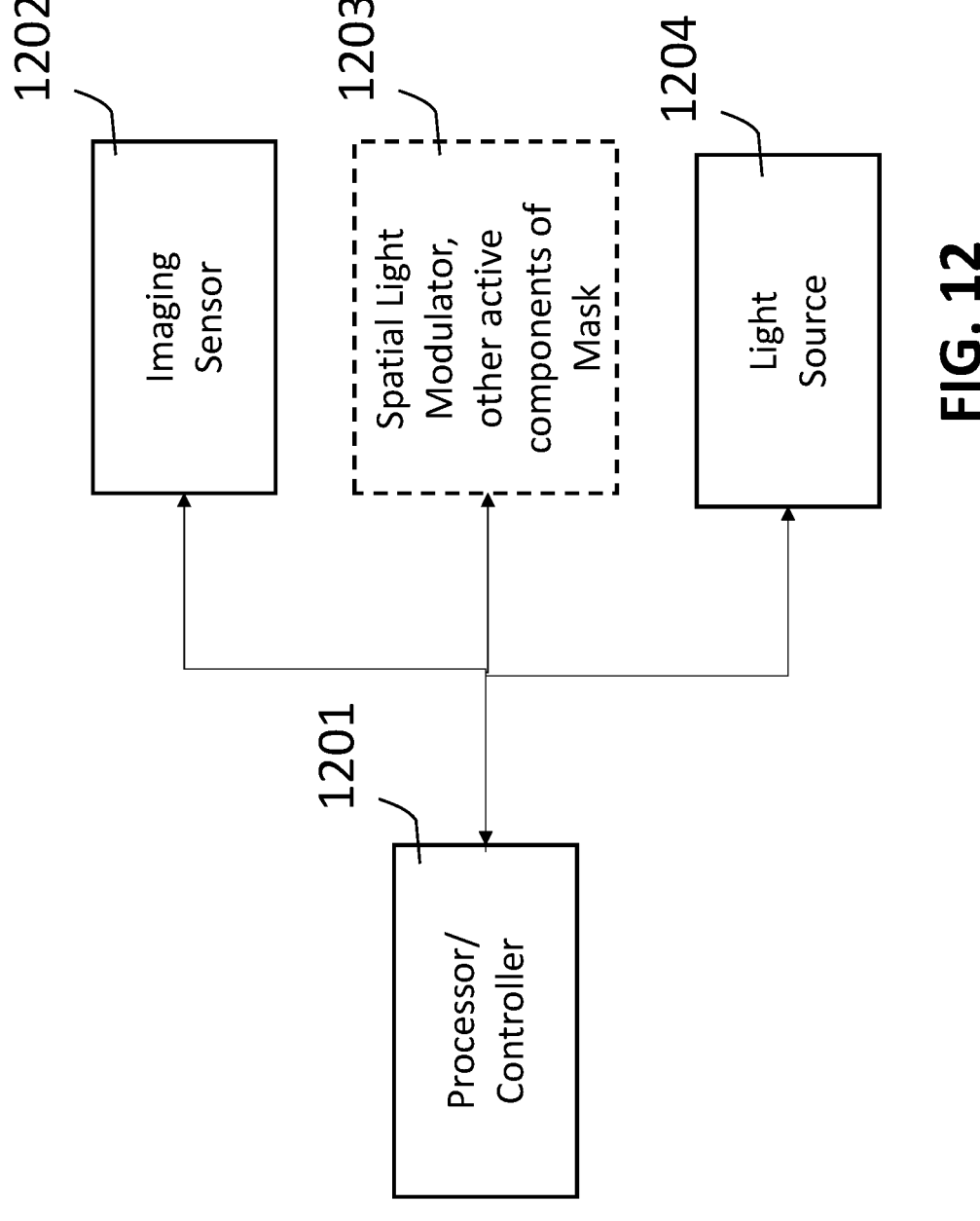
FIG. 12 illustrates a block diagram of various components that can be used to control the operations of the disclosed system in accordance with some example embodiments.

FIG. 12 illustrates a block diagram of various components that can be used to control the operations of the disclosed system in accordance with some example embodiments. In particular, a processer/controller 1201 can be configured to communicate with one or more imaging sensors 1202 and one or more light sources 1204. In embodiments where active components such a liquid crystal display (LCD) or a spatial light modulator are used (collectively 1203), the processer/controller 1201 can be configured to communicate with, and control the operations of, those components 1203. The processor/controller 1201 can further include, or be coupled to, a memory that stores processor executable code that causes the processor/controller 1201 to generate and transmit/receive suitable information to/from the various system components, as well as suitable input/output (IO) capabilities (e.g., wired or wireless) to transmit and receive commands and/or data with to and from the active components/devices, the imaging sensors 1202, and the light sources 1204. The imaging sensor 1202 may be part of a camera and can include a CCD, a CMOS or another light sensing device. The processor/controller 1201 may receive the information associated with images captured by the imaging sensor 1202, and further process that information to produce data indicative of the sensed wave fronts, as well as images or other data that can be displayed and/or further processed.

One aspect of the disclosed embodiments relates to a wave front sensor system that includes a first lenslet array comprising a plurality of lenses positioned to receive at least a portion of an incoming wave front, and a mask positioned at a focal plane of the first lenslet array to receive and filter a Fourier transformed wave front that is produced by the first lenslet array at the focal plane. The mask includes a plurality of sections, wherein each section of the mask is configured to receive light from a corresponding lens of the first lenslet array. Each section of the mask is configured to (a) produce a reference wave front from the Fourier transformed wave front incident thereon and (b) allow a portion of the Fourier transformed wave front incident thereon to pass therethrough or reflect therefrom. The wave front sensor system also includes a sensor array comprising a plurality of light sensitive detectors and positioned to receive the reference wave front produced in (a) and the wavefront in (b), and to detect an intensity value representative of a phase of the incoming wave front.

In an example embodiment, the wave front sensor system further includes a second lenslet array positioned between the mask and the sensor array. The second lenslet array includes a plurality of lenses, wherein each lens of the second lenslet array is positioned to receive light from a corresponding section of the mask and associated with a corresponding lens of the first lenslet array. In another example embodiment, the sensor array is positioned at first side and at a focal plane of the second lenslet array, and the mask is positioned at a second side and at a focal plane of the second lenslet array. In yet another example embodiment, the mask is configured to convert phase variations of the incoming wave front into intensity variations measurable by the sensor array. In still another example embodiment, the intensity variations measurable by the sensor array are related to a phase of the incoming wave front at different parts of the incoming wave front.

According to another example embodiment, each section of the mask is configured to impart a phase shift onto the Fourier transformed wave front incident thereon. In one example embodiment, each section of the mask includes a central region at a center of a transmissive substrate, and the central region has a diameter equal to approximately one half an Airy diameter. In another example embodiment, each section of the mask is configured as a pinhole filter that includes an absorbing metal coating that allows only a fraction of light, in the range 0.005 to 0.05, incident thereon to pass therethrough. The absorbing metal coating is positioned on a clear substrate that allows light incident on surrounding locations of the absorbing metal coating to pass therethrough.

In another example embodiment, the wave front sensor system further includes a polarizer positioned to receive the incoming wave front before reaching the first lenslet array, and to modify a polarization of the incoming wave front. In this example embodiment, the mask is a polarization sensitive mask and is configured to produce the reference wave front that has a first polarization state and a transmitted, or reflected, wave front that has a second polarization state that is orthogonal to the first polarization state. The sensor array, in this embodiment, includes a plurality of polarizer elements that each allow a different polarized light to pass therethrough. In one example embodiment, the polarizer includes one or more waveplates. In another example embodiment, the sensor array includes a division-of-focal-plane polarization sensitive focal plane array with four different sets of linear polarizer elements that are oriented at 0, 45, −45 and 90 degrees. In still another example embodiment, the mask includes an array of disks of wire grid polarizers oriented in a first direction, and wherein other wire grid polarizers are oriented in an orthogonal direction with respect to the first direction.

According to another example embodiment, the wave front sensor system is part of a measurement system that includes one or more illumination sources configured to produce light for illuminating a target object, and the wave front sensor system is positioned to receive at least a portion of reflected light from the target object that forms at least part of the incoming wave front. In one example embodiment, the measurement system includes a beam splitter to allow light from the one or more illumination source to pass therethrough for illuminating the target object, the beam splitter positioned to receive and direct the reflected light from the target object to the wave front sensor system. In another example embodiment, the wave front sensor system is a first wave front sensor system, and the measurement system includes one or more additional wave front sensor systems positioned to receive at least part of the light reflected from the object. In yet another example embodiment, one or more of the wave front sensor systems are positioned at (a) a different angle or (b) at a different distance with respect to the target object compared to at least another one of the wave front sensors. In still another example embodiment, one or more of the wave front sensor systems are configured to sense the incoming wave front (a) at a different polarization, (b) at a different wavelength, or (c) at a different dynamic range compared to at least another one of the wave front sensors.

In one example embodiment, the first lenslet array or the second lenslet array of the wave front sensor system comprises an array of cylindrical lenses that are repeated in one direction. In another example embodiment, the first lenslet array or the second lenslet array of the wave front sensor system comprises an array of lenses arranged in a square grid configuration, or in a rotated square grid configuration.

Another aspect of the disclosed embodiments relates to a wave front sensor system that includes a first array comprising a plurality of reflective or refractive elements positioned to receive at least a portion of an incoming wave front, and a mask positioned at a Fourier transform plane of the first array to receive and filter a Fourier transformed wave front that is produced by the first array. The mask includes a plurality of sections, wherein each section of the mask is configured to receive light from a corresponding element of the first array, and each section of the mask is configured to (a) produce a reference wave front from the Fourier transformed wave front incident thereon and (b) allow a portion of the Fourier transformed wave front incident thereon to pass therethrough or reflect therefrom. The wave front sensor system also includes a sensor array comprising a plurality of light sensitive detectors and positioned to receive the reference wave front produced in (a) and the wavefront in (b), and to detect an intensity value representative of a phase of the incoming wave front.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes Only a few implementations and examples are described and other implementations, enhancements and variations can be made based on what is described and illustrated in this patent document.

What is claimed is:

1. A wave front sensor system, comprising:
   a first lenslet array comprising a plurality of lenses positioned to receive at least a portion of an incoming wave front;
   a mask positioned at a focal plane of the first lenslet array to receive and filter a Fourier transformed wave front that is produced by the first lenslet array at the focal plane, the mask including a plurality of sections, wherein each section of the mask is configured to receive light from a corresponding lens of the first lenslet array, each section of the mask configured to (a) produce a reference wave front from the Fourier transformed wave front incident thereon and (b) allow a portion of the Fourier transformed wave front incident thereon to pass therethrough, or reflect therefrom; and
   a sensor array comprising a plurality of light sensitive detectors and positioned to receive the reference wave front produced in (a) and the portion of the Fourier transformed wave front incident on or reflected from the mask in (b), and to detect an intensity value representative of a phase of the incoming wave front.

2. The wave front sensor system of claim 1, further including a second lenslet array positioned between the mask and the sensor array, the second lenslet array including a plurality of lenses, wherein each lens of the second lenslet array is positioned to receive light from a corresponding section of the mask and associated with a corresponding lens of the first lenslet array.

3. The wave front sensor system of claim 2, wherein the sensor array is positioned at first side and at a focal plane of the second lenslet array, and the mask is positioned at a second side and at a focal plane of the second lenslet array.

4. The wave front sensor system of claim 1, wherein the mask is configured to convert phase variations of the incoming wave front into intensity variations measurable by the sensor array.

5. The wave front sensor system of claim 4, wherein the intensity variations measurable by the sensor array are related to a phase of the incoming wave front at different parts of the incoming wave front.

6. The wave front sensor system of claim 1, wherein each section of the mask is configured to impart a phase shift onto the Fourier transformed wave front incident thereon.

7. The wave front sensor system of claim 1, wherein each section of the mask includes a central region at a center of a transmissive substrate, the central region having a diameter equal to approximately one half an Airy diameter.

8. The wave front sensor system of claim 1, wherein each section of the mask is configured as a pinhole filter that includes an absorbing metal coating that allows only a fraction of light, in the range 0.005 to 0.05, incident thereon to pass therethrough, the absorbing metal coating positioned on a clear substrate that allows light incident on surrounding locations of the absorbing metal coating to pass therethrough.

9. The wave front sensor system of claim 1, further including a polarizer positioned to receive the incoming wave front before reaching the first lenslet array, and to modify a polarization of the incoming wave front, wherein:
   the mask is a polarization sensitive mask and is configured to produce the reference wave front that has a first polarization state and a transmitted, or reflected, wave front that has a second polarization state that is orthogonal to the first polarization state, and
   the sensor array includes a plurality of polarizer elements that each allow a different polarized light to pass therethrough.

10. The wave front sensor system of claim 9, wherein the polarizer includes one or more waveplates.

11. The wave front sensor system of claim 9, wherein the sensor array includes a division-of-focal-plane polarization sensitive focal plane array with four different sets of linear polarizer elements oriented at 0, 45, −45 and 90 degrees.

12. The wave front sensor system of claim 9, wherein the mask includes an array of disks of wire grid polarizers oriented in a first direction, and wherein other wire grid polarizers are oriented in an orthogonal direction with respect to the first direction.

13. The wave front sensor system of claim 1, wherein the wave front sensor system is part of a measurement system that includes one or more illumination sources configured to produce light for illuminating a target object, and the wave front sensor system is positioned to receive at least a portion of reflected light from the target object that forms at least part of the incoming wave front.

14. The wave front sensor system of claim 13, wherein the measurement system includes a beam splitter to allow light from the one or more illumination source to pass therethrough for illuminating the target object, the beam splitter positioned to receive and direct the reflected light from the target object to the wave front sensor system.

15. The wave front sensor system of claim 13, wherein the wave front sensor system is a first wave front sensor system, and the measurement system includes one or more additional wave front sensor systems positioned to receive at least part of the light reflected from the object.

16. The wave front sensor system of claim 15, wherein one or more of the wave front sensor systems are positioned at (a) a different angle or (b) at a different distance with respect to the target object compared to at least another one of the wave front sensors.

17. The wave front sensor system of claim 15, wherein one or more of the wave front sensor systems are configured to sense the incoming wave front (a) at a different polarization, (b) at a different wavelength, or (c) at a different dynamic range compared to at least another one of the wave front sensors.

18. The wave front sensor system of claim 1, wherein the first lenslet array or the second lenslet array comprises an array of cylindrical lenses that are repeated in one direction.

19. The wave front sensor system of claim 1, wherein the first lenslet array or the second lenslet array comprises an array of lenses arranged in a square grid configuration, or in a rotated square grid configuration.

* * * * *